United States Patent
Merrien et al.

(10) Patent No.: US 8,032,748 B2
(45) Date of Patent: Oct. 4, 2011

(54) SYSTEM FOR ALLOCATING A CHIP CARD TO A NETWORK OPERATOR

(75) Inventors: Lionel Merrien, Montreal (CA); Gary Chew, Aix-en-Provence (FR); Max De Groot, La Bouilladisse (FR)

(73) Assignee: Gemalto SA, Meudon (FR)

( * ) Notice: Subject to any disclaimer, the term of this patent is extended or adjusted under 35 U.S.C. 154(b) by 1138 days.

(21) Appl. No.: 11/793,676

(22) PCT Filed: Dec. 6, 2005

(86) PCT No.: PCT/EP2005/056535
§ 371 (c)(1),
(2), (4) Date: Jun. 22, 2007

(87) PCT Pub. No.: WO2006/067037
PCT Pub. Date: Jun. 29, 2006

(65) Prior Publication Data
US 2008/0276090 A1    Nov. 6, 2008

(30) Foreign Application Priority Data
Dec. 22, 2004  (FR) ...................................... 04 13714

(51) Int. Cl.
*H04L 9/00*    (2006.01)
(52) U.S. Cl. ........ 713/169; 713/155; 713/161; 713/168; 713/170; 713/176; 380/28; 380/247; 380/248; 726/2; 726/9
(58) Field of Classification Search .......... 713/168–169, 713/155, 161, 170, 176; 380/28, 247, 248; 726/2, 9
See application file for complete search history.

(56) References Cited

U.S. PATENT DOCUMENTS

| 5,557,679 | A | 9/1996 | Julin et al. |
| 6,976,011 | B1* | 12/2005 | Capitant et al. .................. 705/67 |
| 7,023,994 | B1 | 4/2006 | Dupre |
| 2003/0033527 | A1 | 2/2003 | Klosa et al. |
| 2004/0102181 | A1* | 5/2004 | Horn .............................. 455/410 |

FOREIGN PATENT DOCUMENTS
WO    2004/025896 A    3/2004

OTHER PUBLICATIONS
PCT/ISA/210 for PCT/EP2005/056535 dated Apr. 27, 2006.
* cited by examiner

*Primary Examiner* — Hosuk Song
*Assistant Examiner* — Bao Tran N To
(74) *Attorney, Agent, or Firm* — Buchanan Ingersoll & Rooney PC (57) ABSTRACT

A chip card needs to be allocated in a secured manner to a network operator via a personalization center in order to determine a final authentication key which is attributed to a subscriber of the operator without its being transmitted via a network. The following is loaded into a card by a module: an algorithm and an allocation key; an algorithm for determination of the authentication key and at least one intermediate authentication key. A module transmits an allocation message which includes a final identity number, a random number and an allocation signature from the center to the card. The card authenticates the message by means of the allocation algorithm as a function of the allocation key and the allocation signature, and determines the final authentication key as a function of the intermediate key and the random number.

14 Claims, 5 Drawing Sheets

FIG. 1

(PRIOR ART)

SYSTEM FOR ALLOCATING A CHIP CARD TO A NETWORK OPERATOR

The present invention relates to a system for allocating a chip card to a specific network operator. More specifically, it relates to the allocation of a chip card to an operator once the card has been produced, personalised by a manufacturer and sent, for example, to a service provider proposed by the operator.

Chip cards are currently allocated to specific network operators during their production and personalisation by a manufacturer. These chip cards are UICC (Universal Integrated Circuit(s) Card) cards with microcontrollers, such as, for example, SIM (Subscriber Identity Module) cards for a GSM-type cellular communication network, or a USIM (Universal Subscriber Identity Module) identity module for an UTMS (Universal Mobile Telecommunications System) third-generation (3GPP) CDMA (Code Divided Multiple Access) network Such a card can be inserted in a mobile terminal and contributes, among others, to identifying the card and, therefore, the subscriber that owns the card.

A service provider can also be an authentication provider, for example a bank, which supplies an identification card that can be inserted in an identification terminal and includes an identifier and an authentication key.

The GSM network will henceforth be used as an example. In this network, the SIM cards comprise, after personalisation, at least one IMSI (International Mobile Subscriber Identity) number assigned to a subscriber of the operator and an authentication key Ki, also assigned to said subscriber. The authentication key Ki and the associated IMSI number already loaded in the card are assigned to a user when he/she subscribes to a communication service provided by an operator. The key Ki is stored in the subscriber's SIM card as well as in an operator database, also known as an authentication centre. In order to reduce the possibility of the key Ki being read, it is never transmitted over the network.

Figure 1:
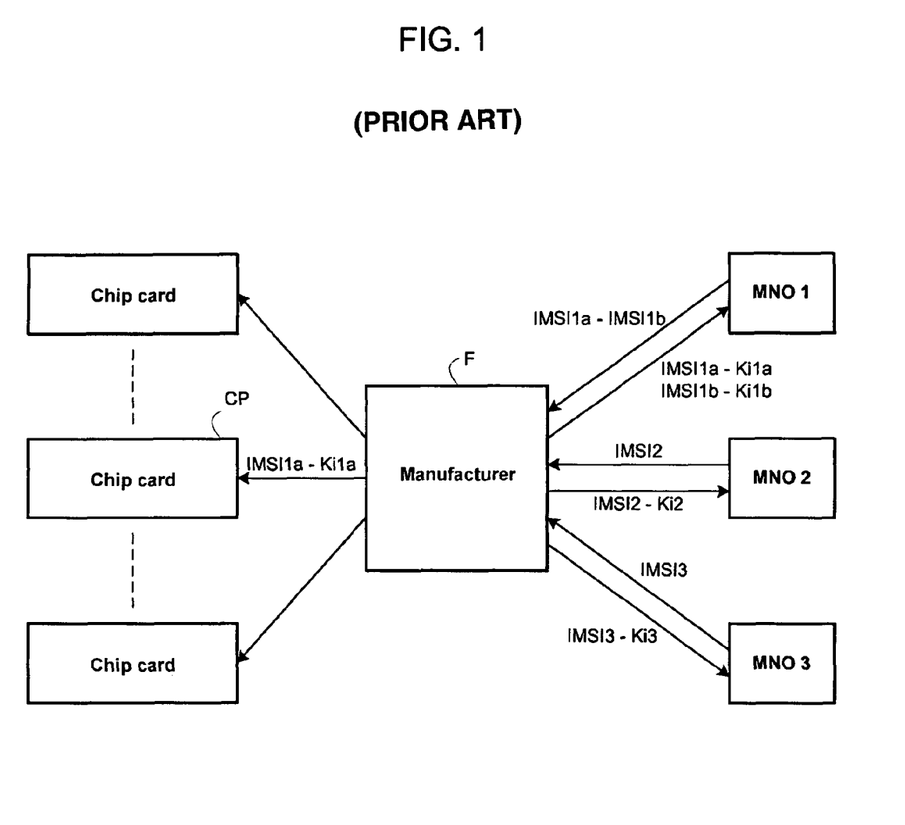
FIG. 1, already described, is a block diagram of a chip-card allocation system according to the prior art.

FIG. 1 shows the known allocation of cards of Mobile Network Operators MNO1, MNO2 and MNO3, for example mobile telephony operators. The operators MNO1, MNO2 and MNO3 order a given number of chip cards from a manufacturer F and respectively send the manufacturer input files comprising their own identity numbers IMSI1, IMSI2 and IMSI3. After receiving the input files, a card personalisation device of the manufacturer F generates authentication keys Ki1, Ki2, Ki3 for the received numbers IMSI1, IMSI2, IMSI3, respectively, by means of a known key-generation algorithm. During card personalisation, the card personalisation device loads the IMSI number of an operator and the associated authentication key Ki in each card and sends output files comprising the numbers and the respective associated authentication keys to the operators, who add them to their databases. For example, two cards respectively store the number and key pairs IMSI1$a$ and KI1$a$, IMSI1$b$ and Ki1$b$, allocated to a common operator MNO1.

This known card allocation does not allow a card which is already allocated to a first operator to be allocated to a second operator. Each card can only be definitively allocated to a single operator.

This drawback is highlighted, for example, when selling services provided by different operators under a single service provider, also known as a virtual network operator, which does not own a network. The provider orders a fixed number of cards from several operators, each comprising a respective IMSI number and a respective Ki number specific to an operator in order to re-sell them, for example in an adjoining shop. As each card is allocated to a specific operator, the provider must constantly manage its stock of already-allocated cards A furnisher can sell many more cards of a first operator than of a second operator and, consequently, the cards of the second operator that are not assigned to subscribers remain stored by the provider. The management of this stock entails a significant cost for the provider. To solve this problem, post-allocation of cards is now provided when selling service subscriptions to users. Post-allocation has the advantage that the cards stored by the provider are neutral and free from any operator allocation and can be allocated progressively when sold according to the users' preference. Card post-allocation does not require any specific personalisation by the operator in order to allocate each card produced.

It is known to post-allocate chip cards by generating an encrypted authentication key Ki either in the card, or in an external entity such as the card manufacturer, and by transmitting the encrypted key, for example by short message SMS either from the card to the operator, or from the external entity to the card and to the operator. These post-allocations are poorly secured as the authentication keys are transmitted over telecommunications networks.

The invention aims to solve the previously mentioned drawbacks by post-allocating cards over telecommunications networks in a secure manner, without transmitting authentication keys over the telecommunications networks.

To this end, a method of allocating a chip card to a network operator using personalisation means in order to determine a final authentication key assigned to a subscriber of the operator is characterised in that it comprises the following steps:

loading an allocation algorithm and an allocation key, as well as an algorithm for determining the authentication key and at least one intermediate authentication key not assigned to the operator, in the card located in the personalisation means, transmitting an allocation message including a final identity number assigned to the subscriber of the operator, a random number relative to the subscriber and an allocation signature resulting from applying the final identity number, the random number and the allocation key to the allocation algorithm, from the personalisation means to the card, authenticating the allocation message by the allocation algorithm in the card according to the allocation key and the allocation signature, and determining the final authentication key assigned to the subscriber by the authentication key determination algorithm in the card according to the intermediate key and the random number.

This method combines the following three advantages: not transmitting the authentication key specific to each subscriber of a network operator over a network, determining this key directly in the card during the transmission of optionally encrypted random data over the network which does not allow the authentication key to be disclosed if it is intercepted by a third party, and not storing the final authentication key in the personalisation means.

While loading the card, a boot program for a first communication between the card and the personalisation means is also loaded in the card, the boot program comprising a boot identity number and a boot authentication key which can be replaced by the final identity number and the final authentication key after determining the final authentication key.

The invention also relates to a system for allocating a chip card to a network operator using personalisation means in order to determine a final authentication key assigned to a subscriber of the operator. The system is characterised in that it comprises:

means of loading an allocation algorithm and an allocation key, as well as an algorithm for determining the authentication key and at least one intermediate authentication key not assigned to the operator, in the card located in the personalisation means, means of transmitting an allocation message including a final identity number assigned to the subscriber of the operator, a random number relative to the subscriber and an allocation signature resulting from applying the final identity number, the random number and the allocation key to the allocation algorithm, from the personalisation means to the card, means of authenticating the allocation message in the card by the allocation algorithm in the card according to the allocation key and the allocation signature, and means of determining the final authentication key assigned to the subscriber by the authentication key determination algorithm according to the intermediate key and the random number.

The invention also relates to a chip card to be allocated to a network operator using personalisation means so as to determine a final authentication key assigned to a subscriber of the operator, the card comprising at least one memory module and a microprocessor. The chip card is characterised in that the memory comprises the following after the card has been loaded by the personalisation means:

an allocation key and an allocation algorithm in order for the microprocessor to authenticate, during card allocation to the operator, an allocation message transmitted by the personalisation means, including a final identity number assigned to the subscriber of the operator, a random number and an allocation signature resulting from applying the final identity number, the random number and the allocation key to the allocation algorithm, and an algorithm for determining an authentication key and at least one intermediate authentication key not assigned to the operator in order for the microprocessor to determine a final authentication key assigned to the subscriber, according to the random number.

The chip card can also comprise a boot program for a first communication between the card and the personalisation means when allocating the card to a subscriber of the operator, the program comprising a boot identity number and a boot authentication key which can be replaced by the final identity number and the final authentication key after determining the final authentication key.

Further characteristics and advantages of the invention will appear more clearly from reading the following description of several preferred embodiments of the invention, provided as non-limiting examples, in reference to the appended drawings, wherein.

Figure 2:
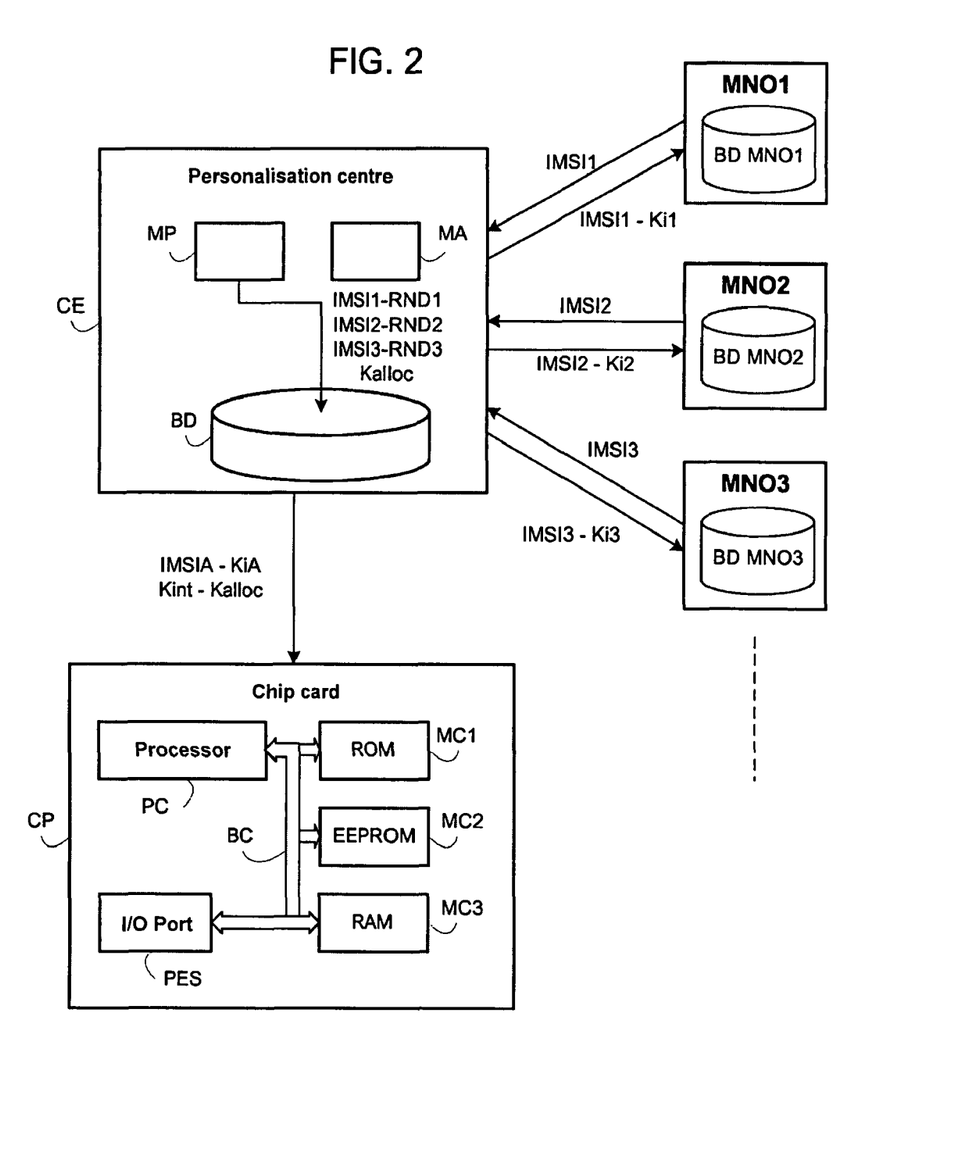
FIGS. 2 and 3 are block diagrams of a card allocation system according to the invention, respectively relating to card personalisation and card allocation.
Figure 3:
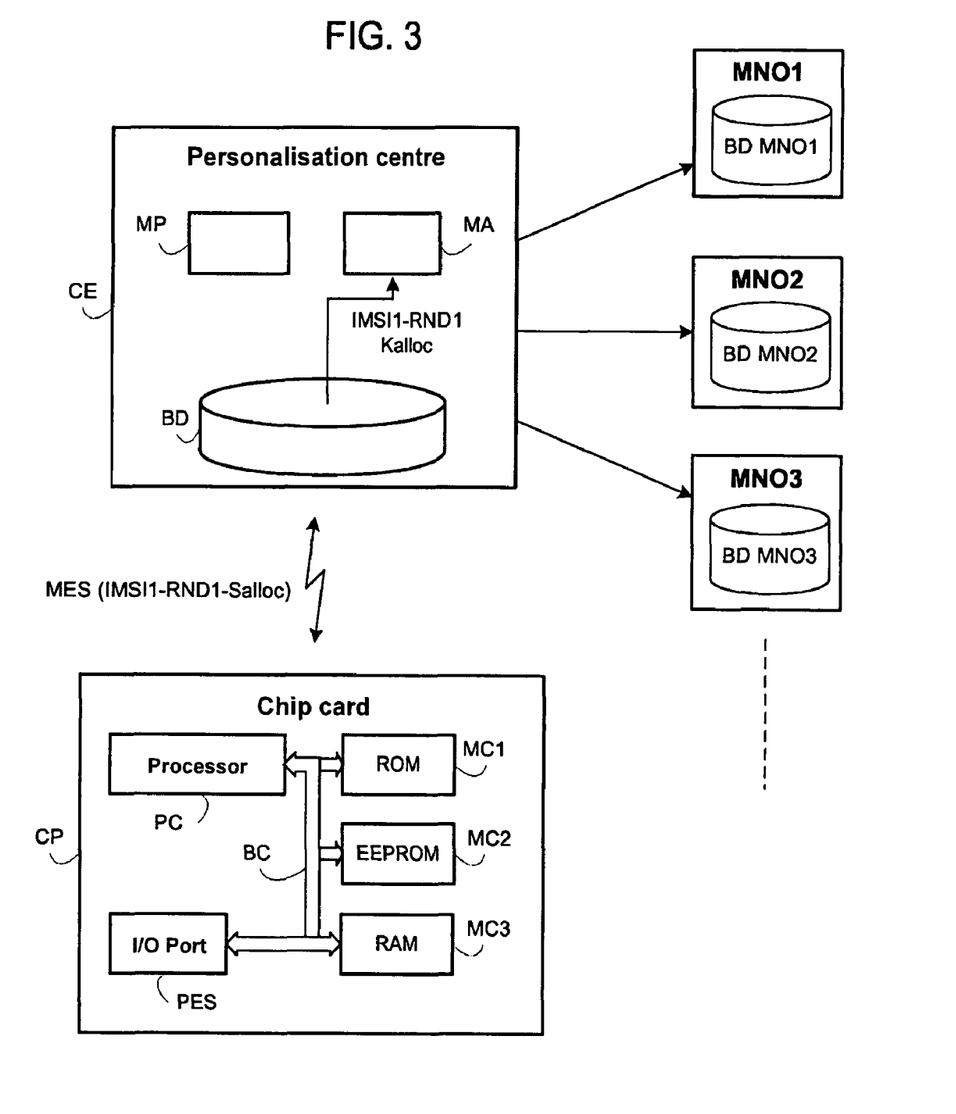

The embodiment shown in FIGS. 2 and 3 shows a system for allocating a chip card to a mobile digital cellular communication network operator according to the invention. A chip card is post-allocated to a specific operator, for example, when a user subscribes to a telecommunication service sold by a service provider such as said network operator or such as a virtual network operator, also known as a distributor or reseller. The card is not allocated directly during production, but rather it is allocated when purchased from the provider after the user selects an operator and an operator service.

The inventive system comprises a personalisation centre CE for personalising chip cards CP in relation to one or more network operators, for example three operators MNO1, MNO2, MNO3. According to a preferred embodiment of the invention, the system manufactures SIM cards and allocates them to GSM operators. The invention can be applied to any type of chip card and any type of network.

The personalisation centre CE is, for example, a server managed by the card manufacturer, which can be accessed over the internet or dedicated lines. It comprises a card personalisation module MP and a card allocation module MA, for example in the form of a computer program, as well as a data base BD storing all the data relating to the operators MNO. The MP and MA modules are explained in detail in the description of the method of the invention.

According to another embodiment, the MP and MA modules are servers installed in different locations and managed by separate entities, and the database is a database management server, the three servers being connected over the internet or dedicated lines.

As is known, a chip card CP, also called a microcontroller card, mainly comprises a processor PC, memory modules MC1 to MC3 and an input/output port PES with or without electrical contact. The various elements of the card CP are connected among each other by a bidirectional bus BC. The MC1 memory module is of ROM or Flash type and it includes the card operating system. The MC2 memory is a non-volatile memory module, for example EEPROM or Flash, in particular used for storing keys, identity numbers and other characteristics of the subscriber profile of the user who owns the card. The MC3 memory is a RAM or SRAM memory module used for processing data.

Figure 4:
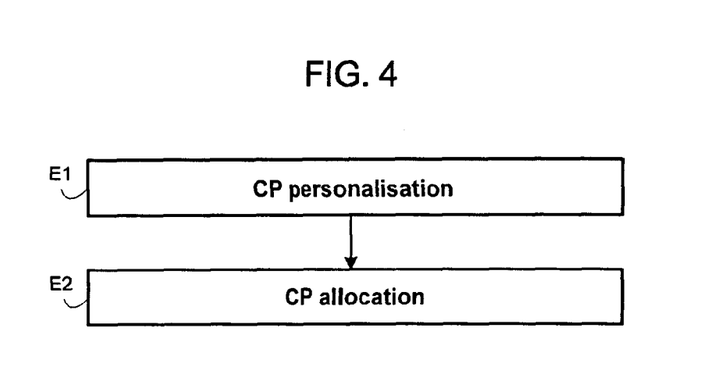
FIG. 4 is an algorithm for a method of post-allocating a chip card according to the invention.

In reference to FIG. 4, the card post-allocation method of the invention comprises two main stages E1 and E2. In the case of an order of M subscriptions by a provider with operators associated with an order CA of M cards from a manufacturer, step E1 consists of manufacturing the M cards and personalising them by the personalisation centre CE without allocating the cards to a specific operator. Once they have been manufactured and personalised, the cards are delivered to the provider. When a user subscribes to a service provided by an operator, for example operator MNO1 according to FIG. 2, through a provider such as a network operator MNO or a virtual network operator, the provider sends the personalisation centre CE an allocation order OA to allocate chip cards, such as the card CP, to the operator MNO1. The personalisation centre CE allocates the card CP to the operator MNO1 in step 2, with no transmission of the subscriber's specific authentication key Ki between the personalisation centre CE and the card CP over the operator network MNO1.

Figure 5:
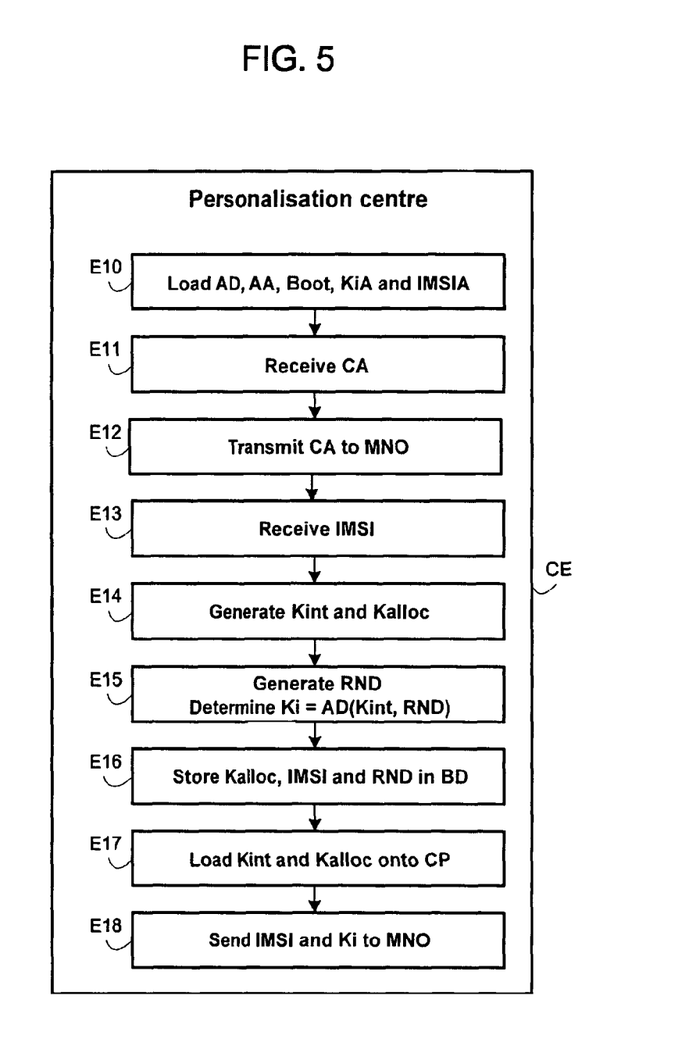
FIG. 5 is an algorithm for a method of personalising a chip card according to the invention.

Card CP personalisation comprises steps E10 to E17, shown in FIG. 5, which is associated with FIG. 2.

In step 10, the personalisation module MP of the personalisation centre CE loads in the memory modules MC1 and MC2 of the card CP an algorithm AD implemented in the personalisation module MP so as subsequently to determine a final authentication key Ki assigned to a subscriber, an allocation algorithm AA implemented in the allocation module MA so as subsequently to authenticate an allocation message MES, and a boot program Boot for a first communication over a network between the personalisation centre and the card during the allocation of said card. The algorithms AD and AA can be known and unidirectional, which is to say that it is impossible to determine an input variable of the algorithm based on the result of the algorithm.

The boot program Boot comprises, for each card manufactured CP, a boot identity number IMSIA and a boot authentication key KiA, which are required for authenticating a first communication over a network between the card CP and the personalisation centre CE. The final identity number IMSI and the final authentication key Ki assigned to a subscriber when subscribing to a service are not known until the card CP is allocated to the network operator providing said subscription. The boot identity number IMSIA and the boot authentication key KiA can be assigned to the personalisation centre and be provided by a first operator according to a contract signed between the card manufacturer and said first operator which authorises first communications between the cards CP and the personalisation centre CE, regardless of the second operators finally chosen by the card subscribers. The number IMSIA and the key KiA are then replaced by the final identity number IMSI and the final authentication key Ki assigned to a subscriber of a second operator during the allocation of the card in step E2. A read/write interface (not shown) of the module MP connects with or without contact to the input/output port PES of the card to load the algorithms AD and AA and the program Boot.

The provider sends an order CA for M cards associated with an order for M subscriptions to the personalisation centre CE which receives the order CA in step E11.

In step E12, the MP module transmits the order CA to at least one operator MNO with which the manufacturer works and securely receives an encrypted file comprising identity numbers IMSI, not yet assigned to subscribers, in response to the order CA, in step E13. For example, in reference to FIG. 2, the three operators MNO1, MNO2 and MNO3 each send final identity numbers IMSI1, IMSI2 and IMSI3, respectively, relating to the purchase of cards, an operator transmitting as many IMSI numbers as there are subscriptions intended for this operator and ordered by the provider. The file of identity numbers is decrypted by the personalisation module.

According to one alternative embodiment, steps E12 and E13 are not performed since the provider is the operator providing its own subscriptions. In step E11, the personalisation centre receives the order CA with the encrypted file of identity numbers sent by the operator.

In step E14, the module MP generates at least one intermediate authentication key Kint necessary for determining the final authentication keys Ki, and M allocation keys Kalloc respectively allocated to the M cards, so as to authenticate allocation messages received by the cards. In order to protect the intermediate key Kint and so as not to send it to the personalisation centre, it is concealed by applying it, along with a random number, to an XOR function in order to send the result of this function instead of the intermediate key. An intermediate authentication key Kint is assigned to more than one card. Several cards can contain the same intermediate authentication key and several intermediate keys can be generated in step E12.

In step E15, a pseudo-random generator in the module MP generates a respective random number RND for each final identity number IMSI sent. Then, the module MP determines a final authentication key Ki, not yet assigned to any card, for each IMSI number sent. The authentication key Ki is determined by the algorithm AD, which has been loaded in the card, according to the generated intermediate authentication key Kint and the generated random number RND associated with the IMSI number. In FIG. 2, three authentication keys are inferred from the relations Ki1=AD(Kint, RND1), Ki2=AD(Kint, RND2) and Ki3=AD(Kint, RND3) according to the random numbers RND1, RND2 and RND3 respectively associated with the numbers IMSI1, IMSI2 and IMS13 sent by the operators MNO1, MNO2 and MNO3. After determining the authentication keys Ki, the module MP stores, in step E16, the allocation keys Kalloc of each card produced and pairs made up of a final identity number IMSI and the associated random number RND in the database BD of the personalisation centre CE. Returning to the example from FIG. 2, the pairs IMSI1—RND1, IMSI2—RND2 and IMSI3—RND3 are respectively stored in memory locations dedicated to the operators MNO1, MNO2 and MNO3 in the database BD.

In step E17, the module MP loads the intermediate authentication key Kint and the respective allocation key Kalloc in the memory MC2 of each card CP via the read/write interface. In step E18, the personalisation centre CE securely sends an encrypted file comprising the final numbers IMSI and the associated final keys Ki to the operator MNO. According to the example in FIG. 2, the operators MNO1, MNO2 and MNO3 respectively receive the number and key pairs IMSI1—Ki1, IMSI2—Ki2 and IMS13-Ki3. The final numbers and the final keys are stored in the respective operator databases where they wait to be queried during card allocation comprising intermediate authentication keys Kint which contribute to determining the final authentication keys Ki.

The manufactured and personalised cards are delivered to the communication service provider.

Figure 6:
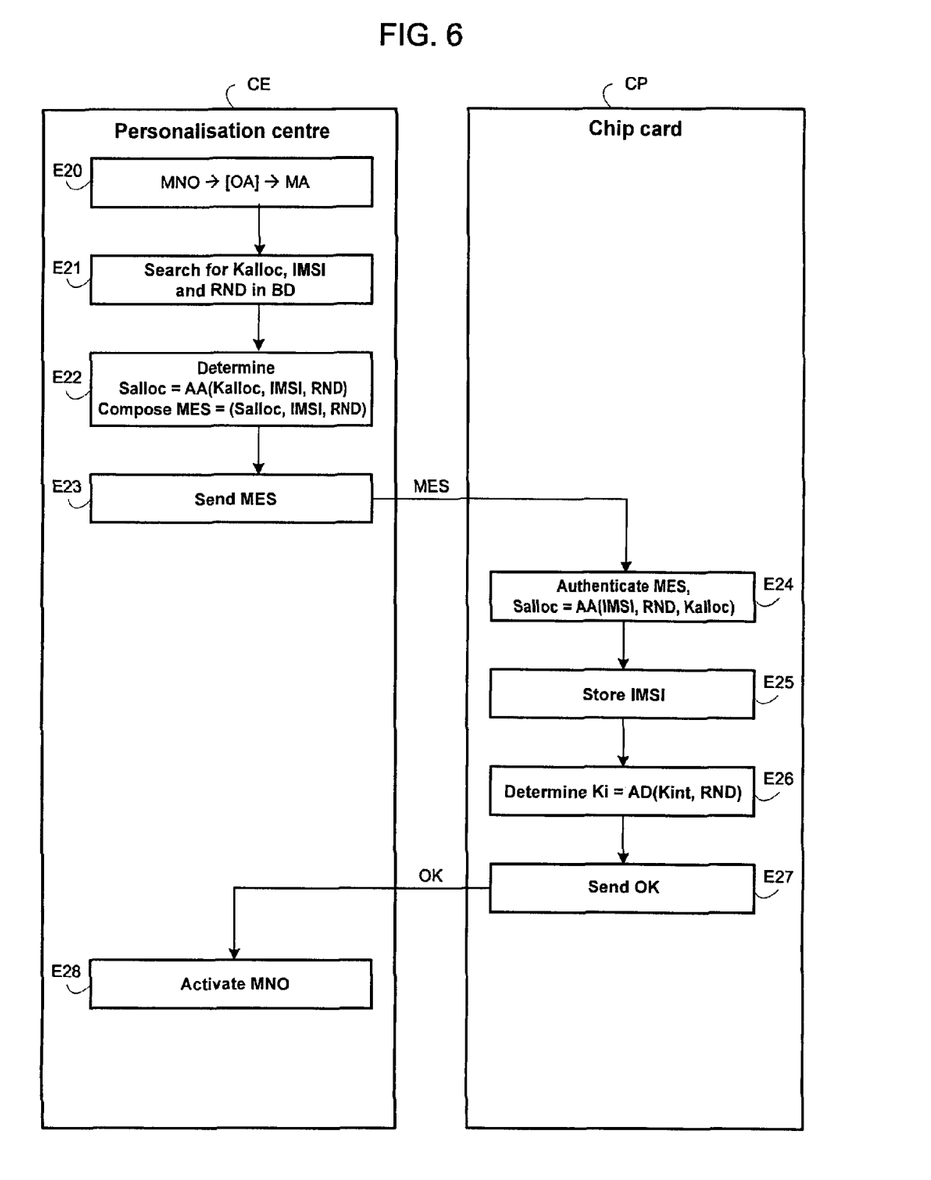
FIG. 6 is an algorithm for a method of allocating a chip card according to the invention.

The allocation of cards to a specific operator comprises steps E20 to E28, shown in FIG. 6, which is associated with FIG. 3. During allocation, the personalisation centre transmits the allocation message to a terminal in which the card to be allocated is inserted.

When a user subscribes to a subscription service provided by the operator MNO, the allocation module MA of the personalisation centre CE receives from the supplier an order OA to allocate a card CP to the user becoming a subscriber, in step E20; the card is identified by its allocation key Kalloc, or else by an identifier associated with the allocation key Kalloc sent to the supplier with the delivery of the card. In step E21, the module MA searches the database BD for an IMSI-RND pair associated with the operator MNO chosen by the user according to the allocation key Kalloc in the allocation order OA, or a Kalloc-IMSI-RND triplet associated with the operator MNO according to said identifier in the allocation order OA. In reference to FIG. 3, the chosen operator is the operator MNO1 and the module MA searches for the IMSI1-RND1 pair in the database BD. In step E22, the module MA applies the key Kalloc and the IMSI-RND pair to the allocation algorithm AA so as to determine an allocation signature Salloc=AA (Kalloc, IMSI, RND). The signature Salloc can be used subsequently to authenticate the card during its allocation to the operator. The module MA generates an allocation message MES including the signature Salloc, the IMSI number and the RND number, and encrypts it according to an encryption algorithm. In step E23, the module MA transmits the allocation message MES over the network associated with the first operator in relation to the program Boot, for example in the form of a short message via a short message server of the network of the first operator, to the card CP inserted in a mobile terminal.

In step E24, the card CP receives the message MES in the memory MC3 and its processor PC decrypts it according to a decryption algorithm pre-installed in the card during its production, which corresponds to the encryption algorithm. The processor PC authenticates the message MES by executing the allocation algorithm AA according to the received IMSI- RND pair and the key Kalloc stored in the card memory MC2, and compares the resulting signature with the signature Salloc extracted from the received message MES. If the compared signatures are identical, the processor writes the identity number IMSI extracted from the received message MES to the card memory MC2, in step E25. Then, in step E26, the processor determines the final card authentication key Ki by executing the algorithm AD according to the key Kint stored in the card memory MC2 and the number RND extracted from the received message MES. The final authentication key Ki is stored in the memory MC2. The final authentication key Ki and the final identity number IMSI replace the boot authentication key KiA and the boot identity number IMSIA, which can be erased.

Once steps E24 to E26 have been executed without incident, the card sends an acknowledgement message OK indicating the successful allocation to the personalisation centre CE, in step E27. If allocation fails during steps E24 to E26, for example if the message MES is not authenticated, the card CP signals this to the personalisation centre by sending another message. In step E28, the personalisation centre transmits the subscription activation to the chosen operator. Once the subscription has been activated by the operator, one of its servers can download various applications, according to the subscribed service in the card CP designated by the final key Ki and the final number IMSI.

As explained previously, every card produced and personalised comprises a boot program Boot, including a boot key KiA and a boot number IMSIA. The manufacturer that owns the personalisation centre acquires a predetermined number of subscriptions from the first operator, each associated with a key KiA and a number IMSIA to be stored via the boot program in the produced cards. The predetermined number of acquired subscriptions is naturally much lower than the number of cards to be produced and personalised, and the keys KiA and numbers IMSIA must be re-usable. For each card produced and not allocated to a particular operator comprising a key KiA and a number IMSIA which can be replaced by the final key Ki and the final number IMSI, respectively, when allocating the card, the personalisation centre assigns, after allocating the card, the replaced key KiA and the number IMSIA to another card to be personalised.

According to another embodiment, several intermediate authentication keys, for example KintA, KintB and KintC, are generated by the module MP and stored in each card CP. According to one example, a provider acquires a first batch of 15 subscriptions shared among different operators MNO1, MNO2 and MNO3. The module MP receives 15 numbers IMSI1 to IMSI15 and records them in memory locations dedicated to the operators MNO1, MNO2 and MNO3 in the database BD. The module MP generates 15 allocation keys Kalloc1 to Kalloc15 for 15 cards respectively, and stores the respective allocation key and the three intermediate keys KintA, KintB and KintC on each card. The module MP also generates 15 random numbers RND1 to RND15 associated with the identity numbers IMSI1 to IMSI15 and determines 15 final authentication keys Ki1 to Ki15 associated with the 15 identity numbers using the algorithm AD according to the 15 random numbers and the first intermediate authentication key KintA. The 15 identity number-random number pairs are stored in the database BD of the personalisation centre under the reference of the intermediate key KintA in the memory locations dedicated to the different operators MNO1, MNO2 and MNO3. The 15 allocation keys Kalloc1 to Kalloc15 are also stored in the database BD of the personalisation centre CE. The associated data IMSI1 to IMSI15 and Ki1 to Ki15 are sent to the operators to be stored in their respective databases. This first batch of personalised cards is delivered to the service provider.

The provider acquires a second batch of 15 subscriptions distributed among the operators, from the operators. The module MP applies the same personalisation steps to the second batch as to the first batch of subscriptions, but it determines 15 final authentication keys Ki16 to Ki30 associated with 15 numbers IMSI16 to IMSI30 according to the second intermediate authentication key KintB. This second batch of personalised cards is delivered to the service provider.

Subscriptions from the first batch of subscriptions are assigned to users and the IMSI-RAND pairs associated with the chosen operators are searched for in the database BD and transmitted, for example by short messages, to the user cards, as explained in steps E20 to E28. Once the subscriptions of the first batch have been assigned, they are activated by the module MA of the personalisation centre of the chosen operators, without deactivating other subscriptions of other operators which have not been chosen. In this embodiment, enough intermediate authentication keys KintA, KintB and KintC are defined beforehand and stored in each card. Thus, a card belonging to a second batch of cards produced can be assigned to a subscription belonging to the first batch of subscriptions acquired by the provider, the authentication keys associated with the first batch of subscriptions being determined by the first intermediate key KintA also stored with the second intermediate authentication key KintB in the card. Conversely, a card belonging to the first batch of produced cards can be assigned to a subscription belonging to a second batch of subscriptions acquired by the provider. This embodiment avoids the deactivation of non-assigned pending subscriptions by the operators and adapts better to the choice of operators on the part of the users. These subscriptions will all be subsequently assigned thanks to the greater number of cards produced which all comprise the intermediate authentication key linked to the determination of final authentication keys associated with said subscriptions.

The invention claimed is:

1. Method of allocating a chip card to one network operator of a plurality of network operators using a personalisation device so as to determine a final authentication key assigned to a subscriber of the operator, comprising the following steps:

loading an allocation algorithm, an allocation key, an algorithm for determining the authentication key and at least one intermediate authentication key not assigned to the operator in the card located in the personalisation device, transmitting an allocation message, including a final identity number assigned to the subscriber of the operator, a random number relative to the subscriber and an allocation signature resulting from applying the final identity number, the random number and the allocation key to the allocation algorithm, from the personalisation device to the card, authenticating the allocation message by the allocation algorithm in the card according to the allocation key and the allocation signature, determining the final authentication key assigned to the subscriber by the authentication key determination algorithm in the card according to the intermediate key and the random number, determining the final authentication key by the authentication key determination algorithm in the personalisation device according to the intermediate key and the random number, and allocating the card to the one network operator from among the plurality of network operators, responsive to selection of the one network operator after production of the card.

2. Method according to claim 1, wherein a boot program for a first communication between the card and the personalisation device is also loaded when loading the card, the boot program comprising a boot identity number and a boot authentication key.

3. Method according to claim 1, further comprising:
including in the card located in the personalisation device, a plurality of intermediate authentication key associated with respectively different network operators such that the determining of the final authentication key allocates the final authentication key to one network operator of the respectively different network operators using a corresponding intermediate authentication key associated with the one network operator.

4. Method according to claim 1, further comprising:
allocating the final authentication key to one network operator of a plurality of network operators using the intermediate key, the intermediate key having not been allocated to the network operators.

5. Method according to claim 1, further comprising:
selecting one network operator from among the plurality of network operators for allocating the card.

6. Method according to claim 1, wherein:
the allocating of the card is responsive to the selection of the one network operator by a card user.

7. Method of allocating a chip card to a network operator using a personalisation device so as to determine a final authentication key assigned to a subscriber of the operator, comprising the following steps:
loading an allocation algorithm, an allocation key, an algorithm for determining the authentication key and at least one intermediate authentication key not assigned to the operator in the card located in the personalisation device;
transmitting an allocation message, including a final identity number assigned to the subscriber of the operator, a random number relative to the subscriber and an allocation signature resulting from applying the final identity number, the random number and the allocation key to the allocation algorithm, from the personalisation device to the card;
authenticating the allocation message by the allocation algorithm in the card according to the allocation key and the allocation signature;
determining the final authentication key assigned to the subscriber by the authentication key determination algorithm in the card according to the intermediate key and the random number; and
in the personalisation device of the card when loading the card:
receiving an order for cards from an external entity and a final subscriber identity number provided by the operator,
generating at least said intermediate authentication key and the allocation key,
determining the final authentication key by the authentication key determination algorithm according to the intermediate authentication key and the random number,
storing the allocation key, the final subscriber identity number and the random number,
loading the allocation key and the intermediate authentication key in the card, and
securely sending the final identity number and the final authentication key to the operator so that the final identity number and the final authentication key are stored by the operator.

8. Method according to claim 7, wherein the personalisation device receives an order to allocate the card to the subscriber from an external entity, search for the final identity number assigned to the subscriber of the operator and the random number associated with the final identity number according to the allocation key, or the final identity number and the random number according to an identifier associated with the allocation key, and determine the allocation signature using the allocation algorithm according to the allocation key, the final identity number and the random number, before transmitting the allocation message.

9. Method of allocating a chip card to a network operator using a personalisation device so as to determine a final authentication key assigned to a subscriber of the operator, comprising the following steps:
loading an allocation algorithm, an allocation key, an algorithm for determining the authentication key and at least one intermediate authentication key not assigned to the operator in the card located in the personalisation device;
transmitting an allocation message, including a final identity number assigned to the subscriber of the operator, a random number relative to the subscriber and an allocation signature resulting from applying the final identity number, the random number and the allocation key to the allocation algorithm, from the personalisation device to the card;
authenticating the allocation message by the allocation algorithm in the card according to the allocation key and the allocation signature; and
determining the final authentication key assigned to the subscriber by the authentication key determination algorithm in the card according to the intermediate key and the random number,
wherein the personalisation device receives an order to allocate the card to the subscriber from an external entity, search for the final identity number assigned to the subscriber of the operator and the random number associated with the final identity number according to the allocation key, or the final identity number and the random number according to an identifier associated with the allocation key, and determine the allocation signature using the allocation algorithm according to the allocation key, the final identity number and the random number, before transmitting the allocation message.

10. System for allocating a chip card to one network operator of a plurality of network operators using personalisation means so as to determine a final authentication key assigned to a subscriber of the operator, comprising:
means for loading an allocation algorithm, an allocation key, an algorithm for determining the authentication key and at least one intermediate authentication key not assigned to the operator in the card located in the personalisation means,
means for transmitting an allocation message, including a final identity number assigned to the subscriber of the operator, a random number relative to the subscriber and an allocation signature resulting from applying the final identity number, the random number and the allocation key to the allocation algorithm, from the personalisation means to the card, means for authenticating the allocation message by the allocation algorithm in the card according to the allocation key and the allocation signature, means for determining the final authentication key assigned to the subscriber by the authentication key determination algorithm according to the intermediate key and the random number, means for determining the final authentication key by the authentication key determination algorithm in the personalisation means according to the intermediate key and the random number, and means for allocating the card to the one network operator from among the plurality of network operators, responsive to selection of the one network operator after production of the card.

11. Chip card to be allocated to to one network operator of a plurality of network operators using a personalisation device so as to determine a final authentication key assigned to a subscriber of the operator, the card comprising at least one memory module and a microprocessor, wherein the memory module comprises the following, after allocating the card to the one network operator from among the plurality of network operators, responsive to selection of the one network operator after production of the card and loading of the card by the personalisation device:

an allocation key and an allocation algorithm in order for the microprocessor to authenticate, during card allocation to the operator, an allocation message transmitted by the personalisation device, including a final identity number assigned to the subscriber of the operator, a random number and an allocation signature resulting from applying the final identity number, the random number and the allocation key to the allocation algorithm, and an algorithm for determining a final authentication key and at least one intermediate authentication key not assigned to the operator in order for the microprocessor to determine the final authentication key assigned to the subscriber, according to the random number.

12. Chip card according to claim 11, comprising a boot program for a first communication between the card and the personalisation device when allocating the card to a subscriber of the operator, the program comprising a boot identity number and a boot authentication key.

13. Method of allocating a chip card to a network operator using a personalisation device so as to determine a final authentication key assigned to a subscriber of the operator, comprising the following steps:

loading an allocation algorithm, an allocation key, an algorithm for determining the authentication key and at least one intermediate authentication key not assigned to the operator in the card located in the personalisation device;

loading a boot program for a first communication between the card and the personalisation device when loading the card, the boot program comprising a boot identity number and a boot authentication key;

transmitting an allocation message, including a final identity number assigned to the subscriber of the operator, a random number relative to the subscriber and an allocation signature resulting from applying the final identity number, the random number and the allocation key to the allocation algorithm, from the personalisation device to the card;

authenticating the allocation message by the allocation algorithm in the card according to the allocation key and the allocation signature;

determining the final authentication key assigned to the subscriber by the authentication key determination algorithm in the card according to the intermediate key and the random number; and in the personalisation device of the card when loading the card:

receiving an order for cards from an external entity and a final subscriber identity number provided by the operator, generating at least said intermediate authentication key and the allocation key, determining the final authentication key by the authentication key determination algorithm according to the intermediate authentication key and the random number, storing the allocation key, the final subscriber identity number and the random number, loading the allocation key and the intermediate authentication key in the card, and securely sending the final identity number and the final authentication key to the operator so that the final identity number and the final authentication key are stored by the operator.

14. Method of allocating a chip card to a network operator using a personalisation device so as to determine a final authentication key assigned to a subscriber of the operator, comprising the following steps:

loading an allocation algorithm, an allocation key, an algorithm for determining the authentication key and at least one intermediate authentication key not assigned to the operator in the card located in the personalisation device;

loading a boot program for a first communication between the card and the personalisation device when loading the card, the boot program comprising a boot identity number and a boot authentication key;

transmitting an allocation message, including a final identity number assigned to the subscriber of the operator, a random number relative to the subscriber and an allocation signature resulting from applying the final identity number, the random number and the allocation key to the allocation algorithm, from the personalisation device to the card;

authenticating the allocation message by the allocation algorithm in the card according to the allocation key and the allocation signature; and determining the final authentication key assigned to the subscriber by the authentication key determination algorithm in the card according to the intermediate key and the random number, wherein the personalisation device receives an order to allocate the card to the subscriber from an external entity, search for the final identity number assigned to the subscriber of the operator and the random number associated with the final identity number according to the allocation key, or the final identity number and the random number according to an identifier associated with the allocation key, and determine the allocation signature using the allocation algorithm according to the allocation key, the final identity number and the random number, before transmitting the allocation message.

* * * * *